3,402,894
BASE-THRUST NOZZLES
Thomas A. Wynosky, Hazardville, and Keith L. Mueller, East Hartford, Conn., assignors to United Aircraft Corporation, East Hartford, Conn., a corporation of Delaware
Filed June 1, 1966, Ser. No. 554,952
11 Claims. (Cl. 239—265.17)

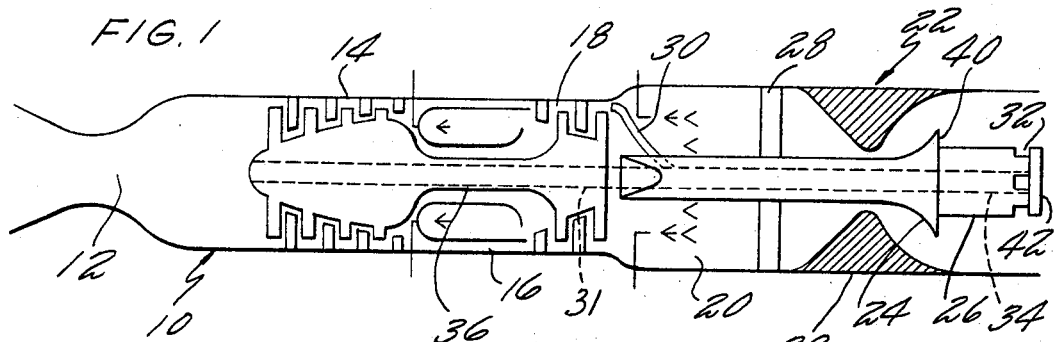
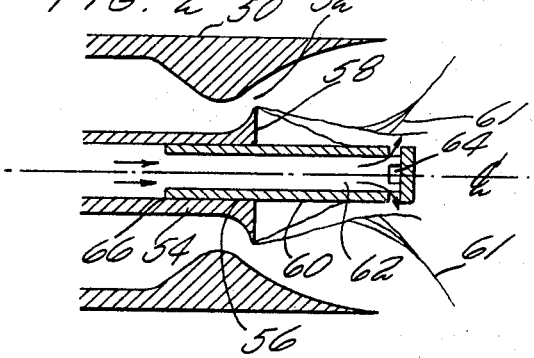
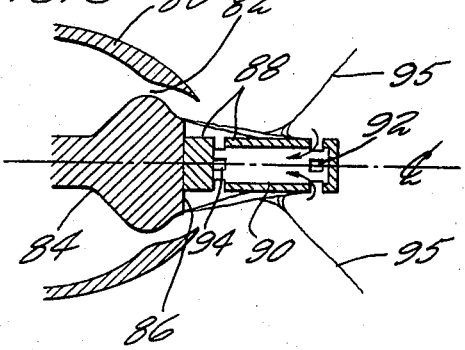
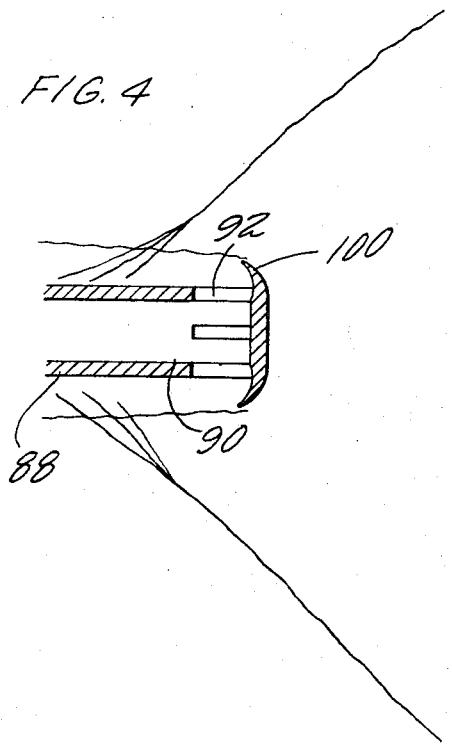
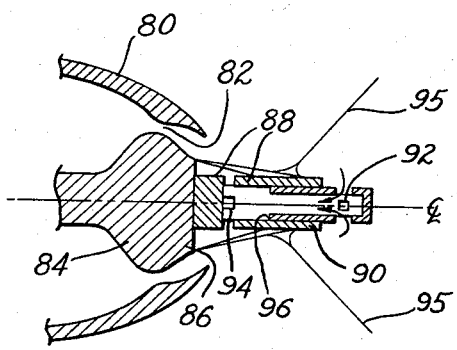

ABSTRACT OF THE DISCLOSURE

Improved base-thrust nozzles are provided for the jet propulsion system of supersonic and hypersonic vehicles. The nozzles include a base member mounted within the nozzle and having a surface on its downstream end substantially normal to the direction of flow of fluid from the nozzle. A sting extends downstream from the base member and affords a second surface for receiving upstream thrust pressure during operation of the propulsion system. The sting preferably includes means for diverting a portion of the jet flow from the nozzle upstream and toward the downstream end of the base member to increase the upstream thrust pressure acting on the base member.

---

This invention relates to improved nozzles for supersonic vehicles. More particularly it relates to base-thrust nozzles for supersonic or hypersonic vehicles having improved thrust in the region adjacent the nozzle base.

In recent years the aircraft and rocket industries have begun use of base-thrust nozzles for supersonic and hypersonic vehicles. Supersonic vehicles are those aircraft, rockets and the like which travel at a speed greater than the speed of sound (Mach-1). Hypersonic vehicles are those which are capable of achieving speeds in excess of Mach-5 or Mach-6.

Base-thrust nozzlese are characterized by a base member mounted inside the housing forming the engine or rocket nozzle, in such a manner that the nozzle throat is formed between the base member and the interior of the nozzle housing surface. Thus, base-thrust nozzles differ from conventional jet aircraft and rocket vehicle nozzles in which the nozzle throat is formed by the configuration of the nozzle housing itself.

It has been found that base-thrust nozzles achieve much higher expansion ratios of the fluid streams used to propel jet or rocket vehicles than can be achieved with conventional nozzles having the same nozzle length and weight. Base-thrust nozzles also offer good performance levels at low altitudes, i.e., at low nozzle operating pressure ratios. Such performance levels cannot be achieved at low altitudes with conventional nozzles having similar expansion ratios.

Other advantages achieved through the use of base-thrust nozzles result from the fact that such nozzles offer minimum external drag. Only minimum drag is produced because in base-thrust nozzles no variations in external configuration or design are required to produce the convergent, and convergent-divergent sections necessary to achievement of supersonic and hypersonic velocities.

Although these various advantages are afforded by the use of base-thrust type nozzles, it has not been heretofore possible to achieve maximum efficiency from these nozzles because they are also characterized by reduced and inefficient thrust at the base region of the nozzles. As the jet stream, which drives the aircraft or rocket vehicle, passes through a base-thrust nozzle, it is inherently separated by the base, and flows through the passageway defined between the nozzle housing and the base member itself. When the jet stream reaches the downstream end of the base member, it has been separated by the base so that the region adjacent the base, and downstream from it, contains little fluid matter from the stream, and consequently comprises a wake region of relatively low, static pressure. This is the "separated base region" which is defined as the region downstream of the nozzle throat where there is an absence of primary jet flow due to the displacement of the jet stream by the base itself. The efficiency of base-thrust nozzles is decreased by this low pressure in the separated base region which produces correspondingly low base-thrust and hence reduces the overall thrust efficiency of the vehicle.

It has been recognized that the overall efficiency of base-thrust nozzles could be improved by increasing the pressure at the separated base region, and many attempts have been made to increase this pressure, and thereby produce increased thrust at the base region. One method is to bleed a fluid stream from a secondary source directly through the base itself into this separated base region by providing apertures in the base plate, i.e., the downstream face of the base member.

Such proposals have not provided a completely desirable solution to the low base-thrust problem, however, for two primary reasons. First, these systems are not efficient because they do not utilize—and in fact directly oppose— the natural flow of the fluid present in the separated base region. The fluid present in the separated base region, is normally being recirculated in a direction toward the base member (i.e., upstream) after having been turned in that direction by contact with the recompression shock wave produced downstream from the nozzle. Thus, the fluid injected downstream through the base member opposes the upstream flow of the fluid normally in the separated base region.

Secondly, prior systems utilizing fluid bleed through the base member penalized the overall propulsion system, either by requiring that a secondary fluid bleed supply be carried along with the system in storage tanks for use in this base-bleed system, or by diversion of fluid from the primary propulsion system. The benefits achieved by the "base-bleed" system has not proved sufficient to overcome this penalty to the primary propulsion system.

Accordingly, it is a primary object of this invention to provide a new and improved base-thrust nozzle.

A further object of this invention is to provide a new and improved base-thrust nozzle which achieves increased pressure in the separated base region and hence increased efficiency of thrust generation in the base region.

Another object of this invention is to provide increased pressure in the separated base region of a base-thrust nozzle, utilizing the natural flow of fluid in the base region, and utilizing the naturally occurring shock wave which is present downstream of the base region.

A further object of this invention is to provide a base-thrust nozzle for use in supersonic vehicles which provides more efficient utilization of all thrust producing surfaces during the operation of the propulsion system, and which thereby achieves improved base pressure and improved thrust during operation.

A still further object of this invention is to provide an improved base-thrust nozzle which increases the pressure in the separated base region, and hence the base-thrust, by utilizing a portion of the fluid from the primary jet flow from the nozzle.

It is an object of one preferred form of this invention to provide a base-thrust nozzle for a supersonic vehicle which utilizes both a secondary fluid and the primary jet flow from the nozzle to increase the pressure in the separated base region. This nozzle provides much higher thrust efficiency than prior art system utilizing secondary fluids.

It is an object of another preferred form of this invention to increase the pressure in the separated base region of a base-thrust nozzle system of a supersonic vehicle without the use of secondary fluids.

Additional objects and advantages of the invention will be set forth in part in the description which follows, and in part will be obvious from the description, or may be learned by practice of the invention, the objects and advantages being realized and attained by means of the instrumentalities and combinations particularly pointed out in the appended claims.

To achieve the foregoing objects and in accordance with its purposes, as embodied and broadly described, the improved base-thrust nozzle of this invention comprises a housing defining an internal passageway capable of containing a high velocity stream of flowing fluid; a base member mounted in the passageway to form, with the housing, a nozzle throat for reducing the area of the passageway available for flow of the fluid stream, which base member has a base plate at its downstream end capable of receiving upstream thrust pressure during the operation of the propulsion system; and a sting attached at one end to the base plate and extending downstream from the base plate. This sting, in accordance with the invention, provides the desired increase in the upstream thrust pressure acting on the base member.

In a preferred form of this invention, the downstream end of the sting affords a second surface capable of receiving upstream thrust pressure during the operation of the propulsion system. The sting thereby displaces not only that portion of the surface of the base plate which is normally acted on by the low pressure region immediately downstream of the base member, but provides a surface (i.e., the downstream end of the sting) which is acted on by a higher pressure region downstream of the low pressure region. The sting transmits the pressure acting on its downstream end to the base plate and thus increases the total upstream thrust of the base member.

The presence of the string has also been found to increase the upstream thrust pressure acting on the undisplaced portion of the base plate itself, and thus, in its preferred form, the presence of the sting in the improved nozzle of this invention increases the pressure acting on the base member both by increasing the pressure acting directly on the base plate itself, and also by substituting the downstream end of the sting for an inefficient portion of the base plate.

In another preferred form of the invention, the pressure in the separated base region, and hence overall thrust efficiency of the base-thrust nozzle, is further increased by providing the nozzle with a sting which contains means for diverting a portion of the fluid from the primary jet flow downstream of the base-thrust nozzle to a region adjacent the base plate (i.e., the separated base region). This diversion of the fluid from the primary jet flow to the separated base region can be achieved in any suitable manner. In one preferred embodiment of this invention, it is achieved by providing the sting with fluid injection means which can be used to create a fluid barrier to the primary jet flow at a position downstream of the base member thereby diverting a portion of the primary flow upstream and into the separated base region.

In another preferred embodiment of this invention, the fluid from the primary downstream jet flow is diverted into the separated base region by providing the sting with a hollow passageway connecting the separated base region with a region of higher pressure downstream from the base member to cause the fluid in the downstream high pressure region to be driven through the sting and into the separated base region by the pressure differential between the downstream region and the separated base region.

The invention consists in the novel parts, constructions, arrangements, combinations and improvements shown and described. The accompanying drawings, which are incorporated in and constitute part of this specification, illustrate several embodiments of the invention and, together with the description, serve to explain the principles of the invention.

In the drawings—

FIG. 1 is a simplified schematic diagram of a turbojet propulsion system utilizing a base-thrust nozzle provided with a sting in accordance with the teachings of this invention;

FIG. 2 is a sectional view taken along the center-line of the nozzle section of a base-thrust nozzle having a hollow sting equipped with fluid injection means in accordance with a preferred embodiment of this invention;

FIG. 3 is a sectional view taken along the center line of a base-thrust nozzle provided with a hollow sting equipped with inlet means at its downstream end and outlet means at its upstream end in accordance with another preferred embodiment of this invention;

FIG. 4 is a sectional view of the downstream portion of a sting of the type illustrated in FIG. 3 provided with flange or scoop extending from the downstream end of the sting and operating in conjunction with the inlets of the sting to facilitate the transfer of fluid to the separated base region in accordance with another preferred embodiment of this invention; and FIG. 5 is a sectional view of the base-thrust nozzle of FIG. 3 provided with telescoping means to permit adjustment of the sting inlet means at its downstream end.

It is to be understood that both the foregoing general description and the following detailed description are exemplary and explanatory but are not restrictive of the invention. Reference will now be made in detail to the preferred embodiments of the invention, examples of which are illustrated in the drawings.

It will be understood that the term "sting" is intended to cover any member providing a downstream extension of the base member, extending from the downstream end of the base member (i.e., the base plate). The sting is desirably elongated in a direction parallel to the axis of the nozzle and desirably has a substantially uniform normal cross-sectional area which is less than that of the base plate. The sting can be a solid member, or can contain an internal passageway, as will be described more fully hereinafter in accordance with the preferred embodiments of this invention. In its most preferred form the sting is an elongated cylinder extending downstream from the base member along an extension of the center-line of the nozzle.

FIG. 1 shows schematically a turbojet engine equipped with the improved base-thrust nozzle of this invention. As embodied in FIG. 1, the engine generally 10 contains an inlet diffuser 12 for receiving the fluids used to drive the engine. Inlet diffuser 12 acts to decrease the relative velocity of the entering fluid, and increasing its pressure. After the air or other fluid passes through the diffuser, it enters an axial-flow compressor 14 which, as embodied, has alternate rows of rotating and stationary blades which further compress the fluid prior to its entry into a combustor 16.

In combustor 16, jet fuel is sprayed, vaporized and burned. The air or other fluid discharged from compressor 14 is fed into the combustion space in any suitable manner such as through louvers in sheet metal combustion liners. These louvers mix the air and fuel vapor for efficient combustion and cool the combustion liner to protect the outer combustion casing from the heat of the flame. As embodied, the engine is equipped with a turbine 18. Turbine nozzles in this section direct the high velocity fluid streams from the combustor against turbine blades mounted on wheels. The fluid is turned in the blades and by this momentum change imparts energy to the turbine wheel. Turbine 18 is connected by a drive shaft 36 to compressor 14 and the energy produced in the turbine is used to drive the compressor.

As embodied in FIG. 1 the engine is equipped with an afterburner 20 located immediately downstream from turbine 18.

It will be understood that the present invention lies in the improved structure of the nozzle and not in the particular embodiment of the overall jet engine illustrated in FIG. 1. Thus, in accordance with the invention, any rocket or jet engine, such as turbojets, ramjets, and the like can be provided with the present improved base-thrust nozzles. The structure upstream of the nozzle section in FIG. 1 is merely illustrative of one of the many types of jet or rocket engines with which the present improved nozzle structure can be used.

The nozzle of the turbojet engine schematically illustrated in FIG. 1 is designated generally 22. As embodied the housing 38 forming nozzle 22 has a generally straight external configuration. Thus, the external portion of the housing does not converge to form the nozzle throat, but the throat of nozzle 22 is formed between the converging-diverging internal surface of the nozzle housing and the sloping surface of a base member 24. Base member 24 has a base plate 40 and is mounted in the passageway formed by housing 38 by struts 28 (FIG. 1) or it can be mounted on support for the turbine wheel. The base-thrust nozzle illustrated in FIG. 1 is an ED-nozzle (expansion-deflection nozzle). This nozzle is one of the two primary types of base-thrust nozzles presently in use. The other type of presently used base-thrust nozzle has a plug-type base illustrated by base member 84 in FIG. 3. In accordance with this invention, any base-thrust type nozzle can be provided with a sting to achieve the benefits of this invention.

As embodied and shown in FIG. 1, sting 26 extends downstream from the downstream end (i.e., the base plate 40) of base member 24. Sting 26 can be attached to base plate 40 by any suitable means. It can be welded to the base plate, riveted to it, or the entire base member and sting can be cast as one piece.

In accordance with the invention, the sting extends downstream from the base plate to increase the upstream thrust pressure acting on the base member. To provide this increased upstream thrust pressure in the separated base region, the sting can be a solid member, or can be provided with a hollow internal passageway capable of diverting a portion of the primary downstream jet flow exiting from nozzle 22 to a region adjacent the base plate, i.e., the separated base region, thereby further increasing the upstream thrust pressure on the base member.

If a solid sting is used the increase in upstream thrust pressure is produced by lowering the detrimental effects produced by the high velocity fluid passing the downstream edges of base member 24 at the outer perimeter of base plate 40 during operation of the propulsion system. This high velocity fluid tends to set up shear forces downstream of the separated base. These shear forces create mixing along a turbulent region extending at an angle from the outer perimeter of the base plate 40 inwardly toward the surface of sting 26. This mixing entrains portions of the mass of fluid from the relatively stagnant separated base region.

The loss of mass from the separated base region caused by this entrainment effectively lowers the pressure in the separated base region. The extension of a solid sting from the base plate in accordance with this invention intercepts this area of turbulence and reduces the amount of mass that is entrained, thereby raising the pressure of that region and increasing the upstream thrust pressure on the base member.

A second source of the increased thrust achieved using a solid sting in accordance with this invention is achieved by the additional component of upstream thrust pressure acting on the downstream end 42 of sting 26.

In operation of the propulsion system, a portion of the jet stream exiting from nozzle 22 is directed downstream at an angle toward sting 26. As this fluid passes the outer perimeter of sting end 42 it also flows downstream in an angular direction toward a center line passing through the sting. However, having experienced the viscous shear forces in the turbulent region, and after having gone through a shock mechanism downstream of the base region 40, the velocity of this fluid is greatly reduced prior to approaching the base region 42. Because the lower fluid velocity sets up lower shear forces behind base region 42, the pressure on base 42 is larger than the pressure that would have acted on that area in base 40. Therefore the upstream thrust pressure applied to sting end 42 and through the sting to base plate 40 is greater than could have been achieved without the use of the sting.

As embodied and shown in FIG. 1, sting 26 is provided with an internal passageway 34. This passageway may be provided by drilling out the sting, by casting a sting having a central passageway, or by any other suitable means which will be readily apparent to those skilled in the art.

In the embodiment shown in FIG. 1, the sting and base member are cast as one piece having a continuous central passageway 34 provided therein. It is preferred, that the passageway be centrally located in the sting and base member, but such central location is not required if the members are otherwise properly balanced. Central passageway 34 of sting 26 and base 24 is connected with secondary fluid inlet line 30. Inlet line 30 connects internal passageway 34 of the base and sting with a source of secondary gas from a point in the engine downstream of the combustor. A similar inlet line 31 could be provided to connect the internal passageway in the base and sting with a source of secondary fluid from the fluid inlet 12 of the engine, or a gas inlet line similar to line 30 could be provided to connect the internal passageway of base 24 and sting 26 with an external source of secondary fluid such as from pressurized tanks and the like.

The internal passageway 34 of the sting and base member connects fluid inlet line 30 with fluid injection means 32. Thus the fluid injection means 32 is connected to a source of combusted gas at a point within the propulsion system downstream of the combustor, and a portion of the combusted gas is diverted from the nozzle 22 to the fluid injection means 32 which injects the combusted gas, during operation of the propulsion system, into the shock region downstream of the nozzle to form a barrier to the primary jet flow from nozzle 22. This barrier is formed at the shock region which occurs downstream of the nozzle during supersonic flight, and diverts a larger portion of the primary downstream jet flow back upstream and into the separated base region, thereby increasing the pressure in the separated base region, and hence the upstream base-thrust on the base member.

If a similar secondary fluid line 31 to that illustrated by line 30 in FIG. 1 is used, except that the line connects the internal passageway in the base and sting to secondary fluid from inlet 12 of the engine, then fluid injection means 32 is connected to an inlet 12 of the propulsion system which diverts a portion of the inlet fluid from the propulsion system to the fluid injection means, which again injects the fluid (from the inlet) into the shock region downstream of base member 24 thereby again forming a barrier to the primary downstream jet flow from nozzle 22 at the shock region, with a resultant diversion of a larger portion of the mass of such flow into the separated base region.

The nozzle section of the engine illustrated in FIG. 1 is shown in section in FIG. 2. The throat of nozzle 52 is formed between the internal wall of housing 50 and the outer periphery of base member 54. Internal passageway 62 of hollow sting 60 is connected to hollow passageway 56 of base member 54. Sting 60 is attached to base plate 58 of base member 54 and extends downstream from the base plate preferably in a direction parallel to the longitudinal axis fo the nozzle.

In accordance with one embodiment of this invention, the sting contains fluid injection means at its downstream end. These fluid injection means are located a sufficient distance downstream from the base plate to allow injection of fluid from these means into a shock region, formed downstream from the nozzle throat. As pointed out above, this injection creates a fluid barrier to the primary downstream jet flow from the nozzle, and diverts a larger portion of the fluid from that primary flow upstream and into the region adjacent the base plate, thereby increasing the upstream thrust pressure on the base plate.

As embodied in FIG. 2 the fluid injection means comprise outlets 64. These outlets are constructed in such a manner that the fluid is injected into the shock region in a direction at an angle to the axis of the nozzle. The outlets are preferably so constructed that the fluid is injected into the shock region radially, or perpendicularly to the axis of the nozzle, or at a slight angle to perpendicular in an upstream direction. This radial or substantially radial injection takes full advantage of the momentum, velocity and pressure of the injected fluid to form the greatest possible aerodynamic blockage in the shock region, thereby increasing the efficiency of the blockage and the diversion of the primary jet flow into the separated base region.

The series of outlets 64 are preferably uniformly distributed around the periphery of sting 60. Since the shock region downstream of the nozzle is conical in shape, this uniform injection of the fluid around the sting achieves maximum blockage and hence increases the efficiency of the barrier in diverting a portion of the matter in the downstream jet flow back in an upstream direction and into the separated base region.

Outlets 64 (FIG. 2) can be of any desired shape. Thus the outlets can be round, elliptical, rectangular or the like. It is also possible to use converging or converging-diverging outlets to increase the velocity of the secondary fluid, and by such modifications supersonic flow of this fluid into the shock region can be obtained, if desired. Thus, by changing the shape of the outlets 64 it is possible to vary the velocity of the secondary fluid at the point of injection.

A steady supersonic flow over a surface, in this instance over the walls of nozzle 52, will produce shock waves if abruptly turned in a compressive sense. A shock wave downstream of nozzle 52 will always be present because the supersonic flow undergoes compressive turning as it leaves the base region behind base 58 and is forced to turn back to the axial direction. Shock waves, fronts or regions are in fact areas of abrupt change in fluid properties of a flow field in which fluid density, pressure, and temperature are increasing along the direction of flow.

Since maximum efficiency is achieved by injection of the secondary fluid in the shock region 61 illustrated in FIG. 2, the sting is preferably constructed so that fluid injection means 64 are located a sufficient distance downstream from the base plate 58 of base member 54 to allow injection of the fluid into the shock region.

In operation there may be some variations in the precise location of the shock region downstream from the nozzle, and hence it may prove beneficial to attach the sting to the base member in a telescoping relationship, so that the location of fluid injection means 64 and hence the location of the point of injection can be varied with variations in the location of the shock region. This can be done automatically through the use of sensor devices and the like. A sting provided with telescoping means 66 is illustrated in FIG. 2. As pointed out, these telescoping means can be connected to sensors, computers and the like (not shown) to automatically vary the position of the fluid injection means with variations in the location of the downstream shock region to maintain the optimum point of injection.

Another embodiment of this invention is shown in FIG. 3. In accordance with this embodiment of the invention, means are provided to increase the pressure at the separated base region by increasing the mass of fluid at that point. This increase in pressure is achieved by transporting a portion of the primary fluid from the high pressure region in the vicinity of the recompression shock wave to the low pressure separated base region. Thus, means are provided to connect the high pressure region downstream of the shock wave with the separated base region.

As here embodied, sting 88 is attached to base plate 86 of plug base 84 and is provided with an internal passageway 90 having one or more inlets 92 at its downstream end, and one or more outlets 94 at its upstream end. Outlets 94 are located in the separated base region and inlets 92 are located in a region of high pressure downstream of base member 84. This high pressure region is preferably the region adjacently downstream from the recompression shock wave caused by the supersonic fluid flow through the nozzle. The pressure differential between the region in the vicinity of inlets 92 and the region in the vicinity of outlets 94 of sting 88 causes the fluid in the downstream high pressure region at inlets 92 to flow into the inlets, through sting passageway 90, and out outlets 94 into the low pressure separated base region, thereby increasing the upstream thrust pressure on base plate 86 and hence base member 84.

In a manner similar to that referred to in the discussion of FIG. 2, the supersonic jet flow through the nozzle 82 formed between the internal wall of housing 80 and the external surface of plug base 84 produces a shock wave or region downstream of the nozzle throat. This shock wave is shown at 95 in FIG. 3. Because the shock region is an area of rapidly increasing pressure, the primary jet flow from nozzle 82 is recompressed as it passes through the shock region.

Thus the fluid downstream of the recompression shock wave is under a much higher pressure than that on the upstream side of the shock wave, and is substantially higher in pressure than the fluid in the separated base region. This pressure differential is utilized in accordance with the invention to transfer a portion of the fluid from the high pressure downstream region to the lower pressure separated base region, thereby increasing the pressure in the separated base region.

As here embodied both inlets 92 and outlets 94 are uniformly distributed around the circumference of the sting. Such a distribution achieves maximum efficiency in the sting system. Both inlets 92 and outlets 94 of sting 88 can be of any suitable shape, such as, for example, round, rectangular, elliptical, or the like.

As is more fully discussed and illustrated in connection with FIG. 5, the sting illustrated in FIG. 3 can also be provided with telescoping means 96, to allow the position of inlets 92 to be varied in accordance with the location of the downstream high pressure region. Similarly, such telescoping means can be automatically actuated by operating means in conjunction with sensors, computers and the like.

It should be noted that while the embodiment of this invention illustrated in FIG. 2 is shown in use in conjunction with an expansion-deflection type base member, and the embodiment of this invention illustrated in FIG. 3 is shown in use in conjunction with a plug-type base member, either of these sting embodiments can be used with either of these types of base-thrust nozzles or for that matter with any type of base-thrust nozzle.

FIG. 4 illustrates in greater detail the downstream portion of sting 88 of FIG. 3, modified to illustrate a preferred inlet structure. FIG. 4 shows sting 88 containing internal passageway 90 which is connected to inlets 92 which are uniformly distributed about the circumference of sting 88. In accordance with this invention means are provided to scoop the fluid flowing downstream in the high pressure region into the inlets, and thereby facilitate the transfer of such fluids through the passageway of the sting and from there through the outlets into the low pressure separated base region. As here embodied the scoop means is a flange deflector 100. The preferred inlets illustrated in FIG. 4 thus include the flange deflector 100 which extends up into the field of primary jet flow and deflects or scoops a portion of the high pressure fluid into inlets 92.

In accordance with the invention, new and improved base-thrust nozzles are provided which achieve improved performance and efficiency at supersonic and hypersonic vehicle speeds. This improved nozzle achieves increased pressure in the separated base region with resultant increased upstream thrust acting on the base member and thereby overcomes the primary problems which have been encountered in the use of previous base-thrust type nozzles.

The invention in its broader aspects is not limited to the specific details shown and described, but departures may be made from such details within the scope of the accompanying claims without departing from the principles of the invention and without scracificing its chief advantages.

What is claimed is:

1. A base-thrust nozzle for the jet propulsion system of a supersonic or hypersonic vehicle which comprises:
    (a) a nozzle housing defining an internal passageway capable of containing a high velocity stream of fluid;
    (b) a base member mounted in the passageway for reducing the area available for flow of the stream of fluid, said base member having a base plate as its downstream end which provides a surface substantially normal to the direction of flow of fluid that is capable of receiving upstream thrust pressure during operation of the propulsion system, the flow of said fluid around said base member and plate creating a region of low pressure downstream of the base plate; and
    (c) a sting extending downstream from the base plate and into a region of higher pressure downstream of the low pressure region, the sting providing a second surface in the higher pressure region capable of receiving upstream thrust pressure during operation of the propulsion system, to increase the upstream thrust pressure acting on the base member.

2. A base-thrust nozzle for the jet propulsion system of a supersonic or hypersonic vehicle which comprises:
    (a) a nozzle housing defining an internal passageway capable of containing a high velocity stream of fluid;
    (b) a base member mounted in the passageway for reducing the area available for flow of the stream of fluid, said base member having a base plate as its downstream end which provides a surface substantially normal to the direction of flow of the fluid that is capable of receiving upstream thrust pressure during operation of the propulsion system, the flow of fluid around said base member and plate creating a region of low pressure downstream of the base plate; and
    (c) a sting extending downstream from the base plate and into a region of higher pressure downstream of the low pressure region, the sting containing fluid injection means for diverting a portion of the downstream jet flow from the nozzle to the lower pressure region adjacent the base plate, to increase the upstream thrust pressure acting on the base member.

3. The nozzle of claim 2, in which the fluid injection means is connected to a source of fluid and injects the fluid into a recompression shock region downstream of said base plate, said fluid creating a barrier to the jet flow from the nozzle and diverting a portion of the flow upstream and into the low pressure region adjacent the base plate, thereby increasing the upstream pressure on the base member.

4. The nozzle of claim 3, in which the fluid injection means is connected to the gas inlet of the propulsion system and diverts a portion of the inlet fluid from the propulsion system to the fluid injection means.

5. The nozzle of claim 3, in which the fluid injection means is connected to a source of combusted gas at a point within the propulsion system and diverts a portion of the combusted gas to said fluid injection means.

6. The nozzle of claim 3, in which said fluid injection means comprises a plurality of outlets uniformly distributed around the periphery of the sting downstream from the base plate.

7. The nozzle of claim 3, in which the sting is provided with telescoping means to adjust the position of the fluid injection means relative to the location of the recompression shock wave.

8. The nozzle of claim 2, in which the fluid injection means comprises a least one inlet in the sting in the downstream higher pressure region, at least one outlet in the sting in the upstream low pressure region adjacent the base plate, and an internal passageway in the sting connecting said inlet with said outlet, the fluid in the downstream higher pressure region flowing into the inlet, through the passageway, and out the outlet into the region adjacent said base member, thereby increasing the upstream thrust pressure on the base member.

9. The nozzle of claim 8, in which the sting has a plurality of inlets and outlets uniformly distributed around the periphery of the downstream and upstream ends, respectively, of the sting.

10. The nozzle of claim 9, in which said sting is provided with telescoping means to adjust the position of the inlets relative to the location of the downstream higher pressure region.

11. The nozzle of claim 9, in which said inlets are provided with flange members that scoop the fluid flowing downstream in the higher pressure region into said inlets, thereby facilitating transfer of the fluid through the sting to the low pressure region adjacent the base plate.

References Cited

UNITED STATES PATENTS

| | | | |
|---|---|---|---|
| 2,663,140 | 12/1953 | Price | 60—242 X |
| 2,793,493 | 5/1957 | Kadosch et al. | 239—265.17 |
| 2,957,307 | 10/1960 | Brandenberger et al. | 60—271 X |
| 3,048,974 | 8/1962 | Bertin et al. | 239—265.17 |
| 3,234,731 | 2/1966 | Dermody et al. | 60—271 X |
| 3,296,799 | 1/1967 | Fuentes | 239—265.23 X |

FOREIGN PATENTS

| | | |
|---|---|---|
| 1,130,131 | 9/1956 | France. |
| 1,268,781 | 6/1961 | France. |

OTHER REFERENCES

Power Jets Ltd., Netherlands printed application No. 243,195, published Jan. 27, 1964. Pertinent pages: 3 shts. of dwg. and pages ½ and 19–23 of spec. describing FIG. 9.

M. HENSON WOOD, JR., *Primary Examiner.*

V. C. WILKS, *Assistant Examiner.*